United States Patent
Takeda (10) Patent No.: US 9,902,348 B2
(45) Date of Patent: Feb. 27, 2018

(54) VEHICLE BODY FRONT STRUCTURE

(71) Applicant: HONDA MOTOR CO., LTD., Tokyo (JP)

(72) Inventor: Tomoya Takeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/279,943

(22) Filed: Sep. 29, 2016

(65) Prior Publication Data

US 2017/0088073 A1 Mar. 30, 2017

(30) Foreign Application Priority Data

Sep. 30, 2015 (JP) ................................ 2015-194495

(51) Int. Cl.
*B60R 16/04* (2006.01)

(52) U.S. Cl.
CPC ................................. *B60R 16/04* (2013.01)

(58) Field of Classification Search
CPC ................. B60L 11/1877; B60R 16/04; B60K 2001/0411
See application file for complete search history.

(56) References Cited

U.S. PATENT DOCUMENTS

| | | | | |
|---|---|---|---|---|
| 2,104,766 A | * | 1/1938 | Saunders | B60R 16/04 180/68.5 |
| 5,086,860 A | * | 2/1992 | Francis | H01M 2/1083 180/68.5 |
| 6,290,013 B1 | * | 9/2001 | Bienenstein, Jr. | B62D 25/082 180/68.5 |
| 2009/0004554 A1 | * | 1/2009 | Reed | H01M 2/1083 429/97 |
| 2013/0307330 A1 | * | 11/2013 | Hotta | B60K 1/04 307/10.1 |
| 2015/0075891 A1 | * | 3/2015 | Suzuki | B60K 1/04 180/291 |

FOREIGN PATENT DOCUMENTS

| | | |
|---|---|---|
| JP | 11-348689 A | 12/1999 |
| JP | 2005-67489 A | 3/2005 |
| JP | 2010-173569 A | 8/2010 |
| JP | 2011-178197 A | 9/2011 |
| JP | 2012-206627 A | 10/2012 |

OTHER PUBLICATIONS

Japanese Office Action dated Jul. 21, 2017, issued in counterpart Japanese Patent Application No. 2015-194495 with English translation. (8 pages).

* cited by examiner

*Primary Examiner* — Frank B Vanaman
(74) *Attorney, Agent, or Firm* — Westerman, Hattori, Daniels & Adrian (57) ABSTRACT

A vehicle body front structure includes a left power unit support section projecting out from a left front side frame toward a vehicle width direction inside, a battery support section that is disposed at a vehicle body front of the left power unit support section, and a battery base that is attached to the battery support section and to the left power unit support section. The battery support section extends toward the vehicle width direction inside in a state coupled to an inside wall and to an upper portion of the left front side frame. A battery is mounted on the battery base.

9 Claims, 11 Drawing Sheets

VEHICLE BODY FRONT STRUCTURE

CROSS REFERENCES TO RELATED APPLICATIONS

The present application claims priority under 35 U.S.C. § 119 to Japanese Patent Application No. 2015-194495, filed Sep. 30, 2015, entitled "Vehicle Body Front Structure," The contents of this application are incorporated herein by reference in their entirety.

TECHNICAL FIELD

The present disclosure relates to a vehicle body front structure in which a power unit support section is attached to a front side frame, and a power unit is supported by the power unit support section.

BACKGROUND

Vehicle body front structures are known in which a battery is attached at a separation above an upper portion of a front side frame (see, for example, Japanese Unexamined Patent Application Publication No. 11-348689).

Namely, a power unit support section is provided to an inside wall of the front side frame so as to be substantially in the same plane as an upper portion of the front side frame. A power plant is supported by the power unit support section. An attachment bracket stands upright from the power unit support section.

A support stay is provided at a separation from the power unit support section in a vehicle body front-rear direction. An upper portion of the support stay is disposed at a position higher than the upper portion of the front side frame.

A battery base is attached to respective upper portions of the support stay and the attachment bracket, and a battery is mounted on the battery base. The battery is thereby attached at a separation above the upper portion of the front side frame.

In the vehicle body front structure of Japanese Unexamined Patent Application Publication No. 11-348689, the number of components can be reduced by employing the power unit support section so as to double as a battery support section.

Note that the battery is a member with a comparatively heavy weight. A comparatively large bending moment (referred to as a tipping moment) due to the battery therefore arises in the support stay and the attachment bracket in a state in which the battery is supported by the support stay and the attachment bracket.

However, the support stay is attached to the inside wall of the front side frame, and the upper portion of the support stay is disposed at a position higher than the upper portion of the front side frame. The attachment bracket stands upright from the power unit support section.

It is therefore difficult to support, the tipping moment arising in the support stay and the attachment bracket, leaving room for improvement from this perspective.

Vehicle body front structures are also known in which a battery base is attached to an attachment portion of a bulkhead, an attachment portion of a damper housing, and a power unit support section (see, for example, Japanese Unexamined Patent Application Publication No. 2005-067489). In the vehicle body front structure of Japanese Unexamined Patent Application Publication No. 2005-067489, a battery mounted on a battery base is attached at a separation above an upper portion of the front side frame.

An attachment portion of a bulkhead and an attachment portion of a damper housing are positioned further to the vehicle width direction outside than the center of gravity of the battery. Accordingly, a comparatively large tipping moment arises in the attachment portion of the bulkhead and the attachment portion of the damper housing due to the weight of the battery.

Accordingly, it is difficult to support the tipping moment using the respective attachment portions of the attachment portion of the bulkhead and the attachment portion of the damper housing, leaving room for improvement from this perspective.

SUMMARY

The present disclosure describes, for example, a vehicle body front structure capable of supporting a tipping moment arising due to a battery.

A first aspect of the present disclosure describes a vehicle body front structure including: a front side frame that extends in a vehicle body front-rear direction; a power unit support section that projects out from the front side frame toward a vehicle width direction inside, with the power unit support section configured to support a power unit; a battery support section that is disposed offset in the vehicle body front-rear direction with respect to the power unit support section, and that extends toward the vehicle width direction inside in a state coupled to an inside wall of the front side frame and an upper portion of the front side frame; and a battery base having a front portion attached to one out of the battery support section or the power unit support section, and having a rear portion attached to the other out of the battery support section or the power unit support section, with the battery base configured to mount a battery.

The power unit support section projects out from the front side frame toward the vehicle width direction inside. The battery support section extends toward the vehicle width direction inside of the front side frame. Accordingly, in a state in which the battery is mounted on the battery base, a position of the center of gravity of the battery is positioned further to the vehicle width direction inside than the front side frame.

The battery is a member with a comparatively heavy weight. A comparatively large bending moment (referred to as tipping moment) due to the battery therefore arises in the battery support section and the power unit support section.

Accordingly, in the first aspect, the battery support section is coupled to the inside wall of the front side frame and the upper portion of the front side frame. This thereby enables the battery support section to be coupled firmly to the front side frame. The power unit support section is a member that supports the power unit. The power unit support section is accordingly a high rigidity member, and is coupled firmly to the front side frame.

The front portion of the battery base is attached to one out of the battery support section or the power unit support section, and the rear portion of the battery base is attached to the other out of the battery support section or the power unit support section.

Accordingly, the comparatively large tipping moment due to the battery can be stably supported by the battery support section and the power unit support section. This thereby enables the battery to be suppressed from tipping toward the vehicle width direction inside by the battery support section and the power unit support section.

In a second aspect of the present disclosure, the battery base preferably includes a raised portion extending along the vehicle width direction, and a coupling portion that is formed in the vicinity of the raised portion, and that, is coupled to the power unit support section.

In this manner, the rigidity of the battery base can be raised by forming the raised portion on the battery base. Moreover, the coupling portion is formed in the vicinity of the high rigidity raised portion, and the coupling portion is coupled to the power unit, support, section.

Note that the power unit support section is a member for supporting the power unit, and has high rigidity and is coupled firmly to the front side frame. This thereby enables the raised portion to be firmly supported by the power unit, support, section. The comparatively large tipping moment due to the battery can accordingly be well-supported by the raised portion.

In a third aspect of the present, disclosure, the vehicle body front structure preferably further includes an upper member that is provided above the front side frame at a vehicle width direction outside of the front side frame, and a reinforcement member that connects the upper member and the front side frame together vertically. An outside end portion of the raised portion is preferably coupled to the reinforcement member.

The outside end portion of the raised portion is accordingly coupled to the reinforcement member. This thereby enables the raised portion to be even more firmly supported by the reinforcement member. The comparatively large tipping moment due to the battery can accordingly be even better supported by the raised portion.

In a fourth aspect of the present disclosure, the power unit support section preferably includes a mount that has a front portion and a rear portion coupled to an upper portion of the front side frame, a bracket that projects out from the mount toward the vehicle width direction inside, and that is coupled to the power unit, and an extension support portion that extends from the mount toward the vehicle width direction inside and that supports the battery base.

The power unit support section accordingly includes the extension support portion. The extension support portion extends from the mount in the vehicle width direction, and the battery base is supported by the extension support portion. Providing the power unit support section with the extension support portion enables the power unit support section to be employed as a battery support section too. This thereby enables a reduction in the number of components of the battery support section, and enables a reduction in weight.

In a fifth aspect of the present disclosure, the battery support section preferably includes a first support bracket that is coupled to the inside wall of the front side frame, that extends upward from the inside wall, and that extends from an upwardly extended upper end toward the vehicle width direction inside, a second support bracket that is coupled to the first support bracket and to the upper portion of the front side frame, and that stands upright from the upper portion, and a third support bracket that is coupled to a free end of the first support bracket and extends in the vehicle body front-rear direction, and that includes a location conforming to the raised portion of the battery base. The first support bracket, the second support bracket, and the third support bracket are preferably formed with substantially L-shaped cross-sections.

In this manner, the battery support section is formed from the three members of the first support bracket, the second support bracket, and the third support bracket. The respective support brackets are formed with substantially L-shaped cross-sections. Accordingly, the rigidity of the first support bracket, the second support bracket, and the third support bracket can be secured using simple shapes. This thereby enables the respective support brackets to be easily bent from small steel plates, enabling costs to be suppressed.

The first support bracket is coupled to the inside wall of the front side frame. The second support bracket is coupled to the upper portion of the front side frame. In addition, the first support bracket and the second support-bracket are coupled together.

Accordingly, the first support bracket and the second support bracket (namely, the battery support section) can be coupled firmly to the front side frame. This thereby enables the comparatively heavy battery to be well-supported by the battery support section.

BRIEF DESCRIPTION OF THE DRAWINGS

The advantages of the disclosure will become apparent in the following description taken in conjunction with the following drawings.

DETAILED DESCRIPTION

Explanation follows regarding a preferable embodiment of the present disclosure, with reference to the accompanying drawings. Note that the directions "front (Fr)", "rear (Rr)", "left (L)", and "right (R)" correspond to directions as viewed from the perspective of a driver.

Embodiment

Figure 1:
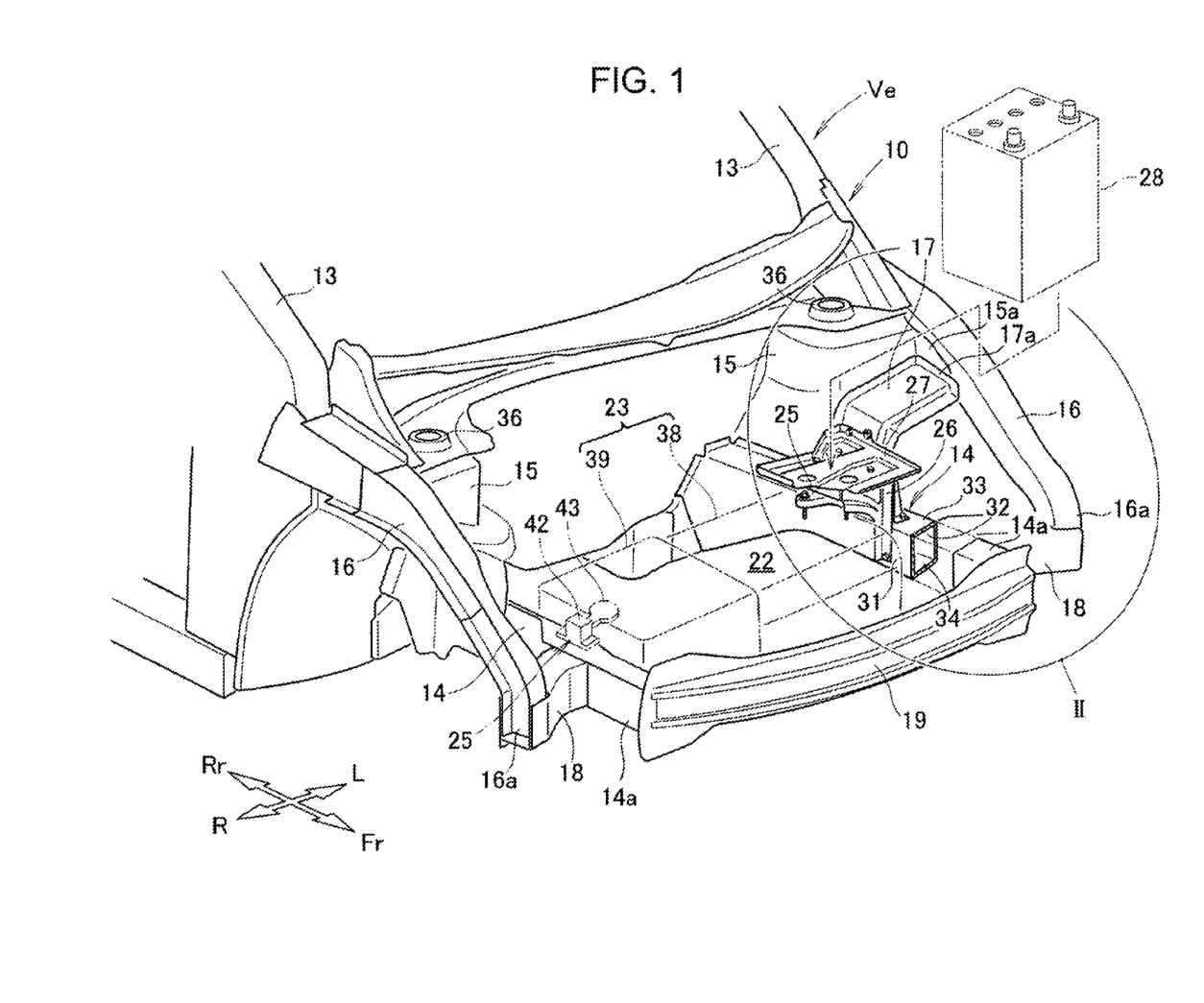
FIG. 1 is a perspective view illustrating a vehicle body front structure according to an embodiment of the present disclosure.

Explanation follows regarding a vehicle body front-structure 10 according to the embodiment. As illustrated in FIG. 1, the vehicle body front structure 10 is a component configuring a front section structure of a vehicle Ve. The vehicle body front structure 10 includes front side frames 14 extending from vehicle width direction insides of a left front pillar 13 and a right front pillar 13 toward the vehicle body front, damper housings 15 standing upright from the respective front side frames 14 to a portion at the vehicle body front of the front pillars 13, and upper members 16 extending from the respective front pillars 13 and past the damper housings 15 toward the vehicle body front.

The vehicle body front structure 10 also includes a reinforcement member 17 that connects the left front side frame 14 and the left upper member 16 together vertically, a left gusset 18 that connects the left upper member 16 and the left front side frame 14 together, a right gusset 18 that connects the right upper member 16 and the right front side frame 14 together, and a bumper beam 19 that spans between front end portions 14a of the left front side frame 14 and the right front side frame 14.

The left front side frame 14, the right front side frame 14, and the bumper beam 19 form an engine room 22.

The vehicle body front structure 10 further includes a power unit 23 disposed inside the engine room 22, a left power unit support section 25 (see also FIG. 3) and a right power unit support section 25 that support the power unit 23, a battery support section 26 provided in the vicinity of the left power unit support section 25, and a battery base 27 that is attached to the battery support section 26 and the left power unit support section 25.

A battery 28 is mounted on the battery base 27 such that the battery 28 is supported by the left power unit support section 25 and the battery support section 26.

The vehicle body front structure 10 is a structure with substantially left-right symmetry. Accordingly, left-side members and right side members of the vehicle body front structure 10 are allocated the same reference numerals. Members on the left side will be described in detail, while explanation regarding the right side members will be omitted.

The left front side frame 14 extends from a vehicle width direction inside of a lower portion of the left front pillar 13 toward the vehicle front side. The left front side frame 14 is a high rigidity member formed with a substantially rectangular cross-section by an inside wall 31, an outside wall 32, an upper portion 33, and a lower portion 34.

The left upper member 16 extends from the left front pillar 13 and past the damper housing 15 at a downward gradient toward the vehicle body front. The left upper member 16 is a high rigidity member formed with a substantially rectangular cross-section. A front end portion 16a of the left upper member 16 is connected to the left front side frame 14 through the left gusset 18.

In this state, the left upper member 16 is disposed above the left front side frame 14 at the vehicle width direction outside of the left front side frame 14.

Figure 2:
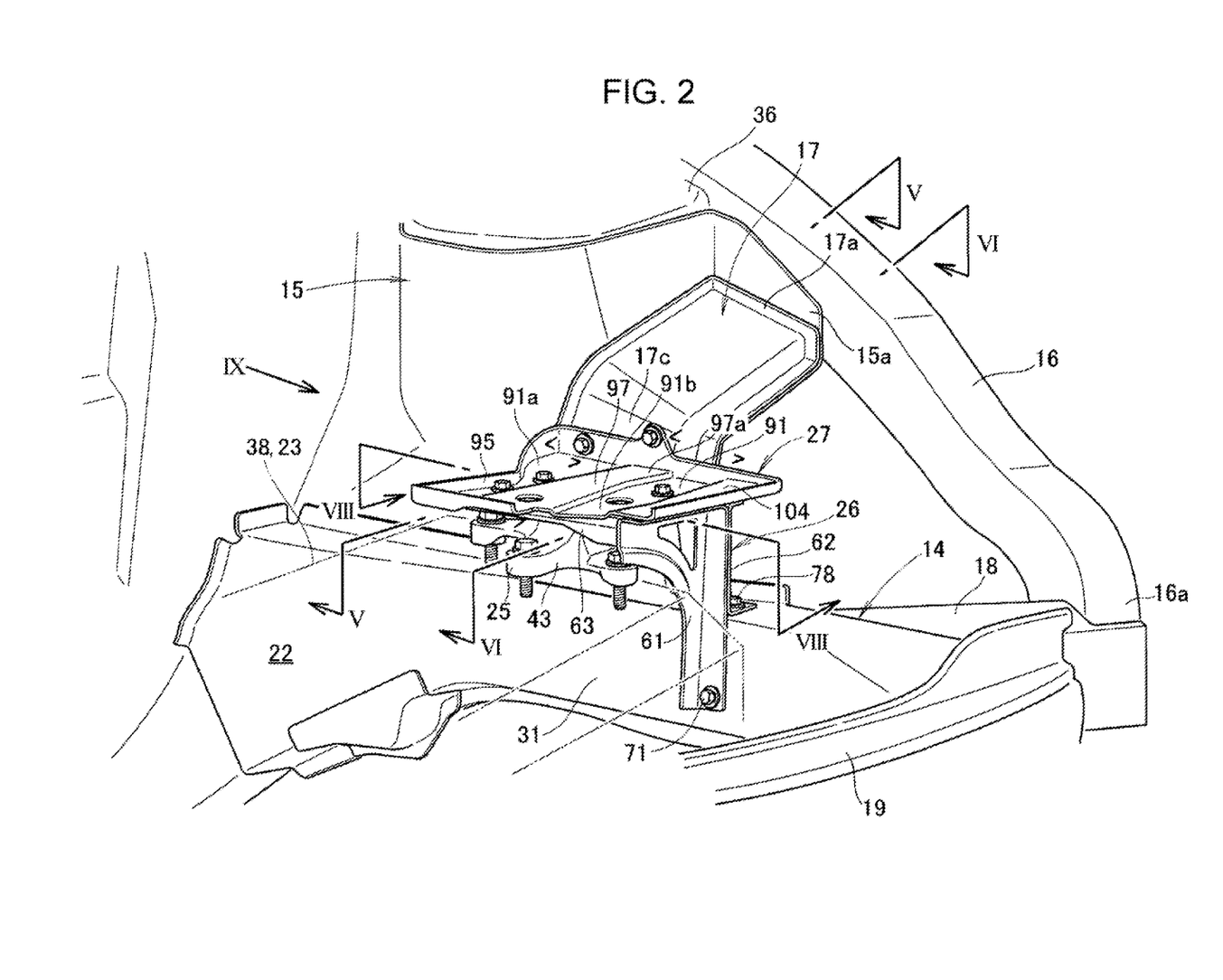
FIG. 2 is an enlarged view of area II in FIG. 1.

As illustrated in FIG. 2, a lower end portion of the damper housing 15 is joined to the left front side frame 14r and an upper end portion of the damper housing 15 is joined to the left upper member 16. Namely, the damper housing 15 is located between the left front side frame 14 and the left upper member 16.

A front suspension damper is housed inside the left damper housing 15 from the vehicle width direction outside, and an upper end portion of the damper is supported by a damper base 36 of the left damper housing 15. The damper base 36 is provided at an apex portion of the left damper housing 15. Namely, the left damper housing 15 is a high rigidity member that supports load input through the damper.

The entire periphery of the reinforcement member 17 is joined to a front portion 15a on the vehicle body front side of the left damper housing 15. Note that the damper housing 15 is located between the left front side frame 14 and the left upper member 16.

Accordingly, an upper end portion 17a of the reinforcement member 17 is joined to the left upper member 16 through the front portion 15a of the left damper housing 15.

A lower end portion 17b of the reinforcement member 17 (see FIG. 5, FIG. 6) is joined to the left front side frame 14, so as to be interposed between the left front side frame 14 and the front portion 15a of the left damper housing 15.

Namely, the left front side frame 14 and the left upper member 16 are connected together vertically by the reinforcement member 17. The front portion 15a of the left damper housing 15 is thereby reinforced by the reinforcement member 17.

Returning to FIG. 1, a transmission 38 of the power unit 23 is supported by the left front side frame 14 through the left power unit support section (power unit support section) 25. An engine 39 of the power unit 23 is supported by the right front side frame 14 through the right power unit support section 25.

Figure 3:
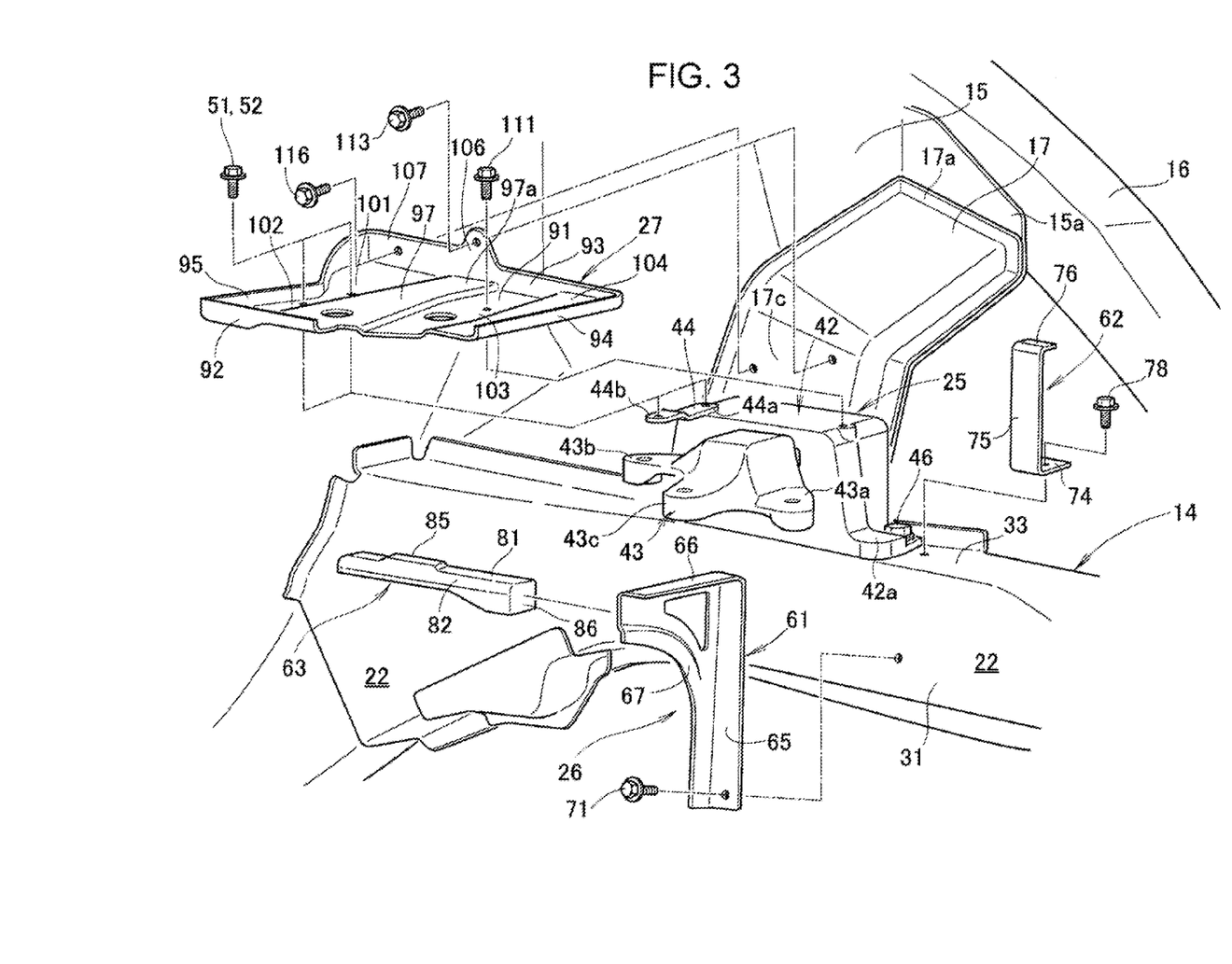
FIG. 3 is an exploded perspective view illustrating the vehicle body front structure in FIG. 2.

As illustrated in FIG. 2 and FIG. 3, the left power unit support section 25 extends from a portion close to the rear of the left front side frame 14 toward the vehicle width direction inside (namely, toward the engine room 22 side). Specifically, the left power unit support section 25 includes a mount 42 coupled to an upper portion 33 of the left front side frame 14, a bracket 43 connected to the mount 42, and an extension support portion 44 extending from the mount 42 toward the vehicle width direction inside.

Figure 4:
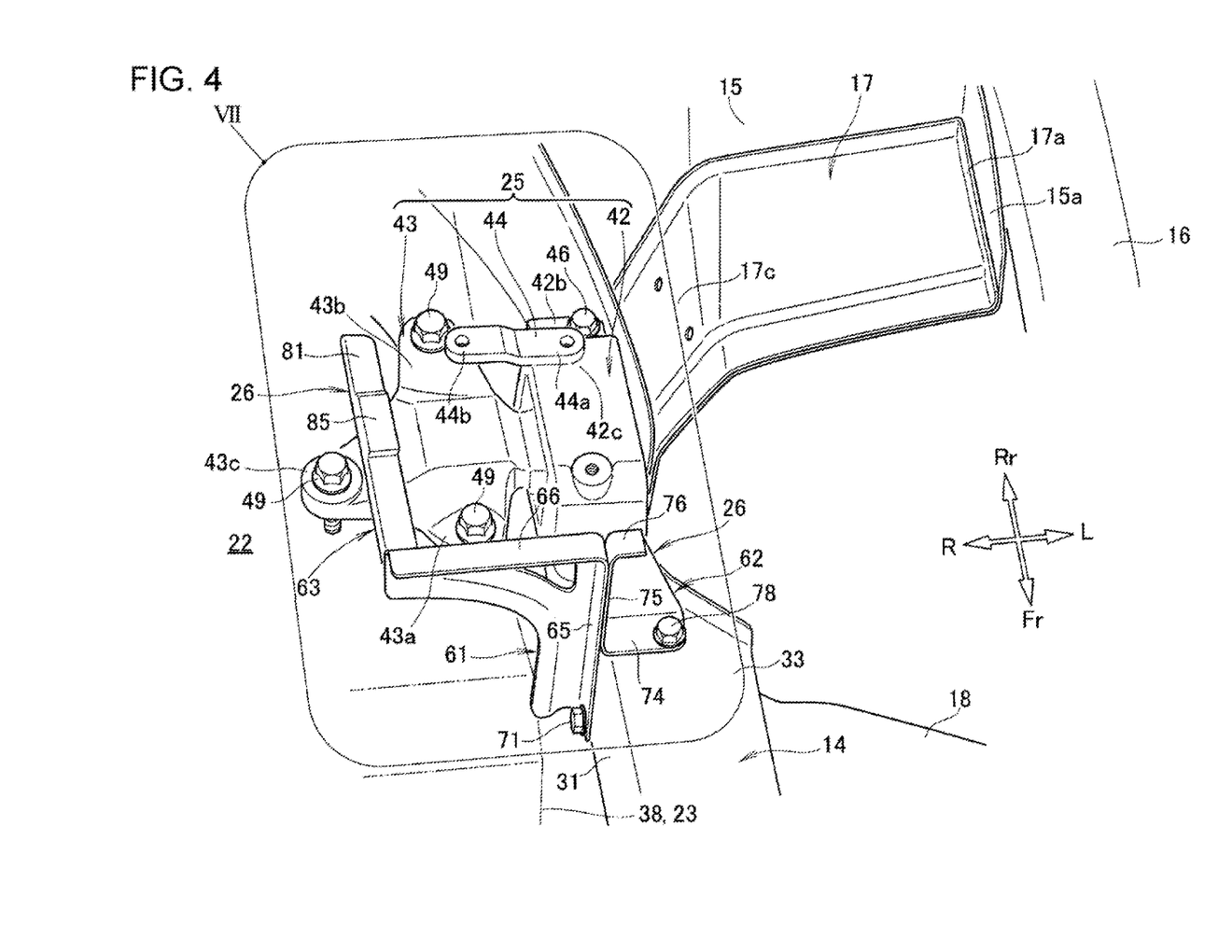
FIG. 4 is a perspective view illustrating a state in which a battery base has been removed from the vehicle body front structure in FIG. 2.
Figure 5:
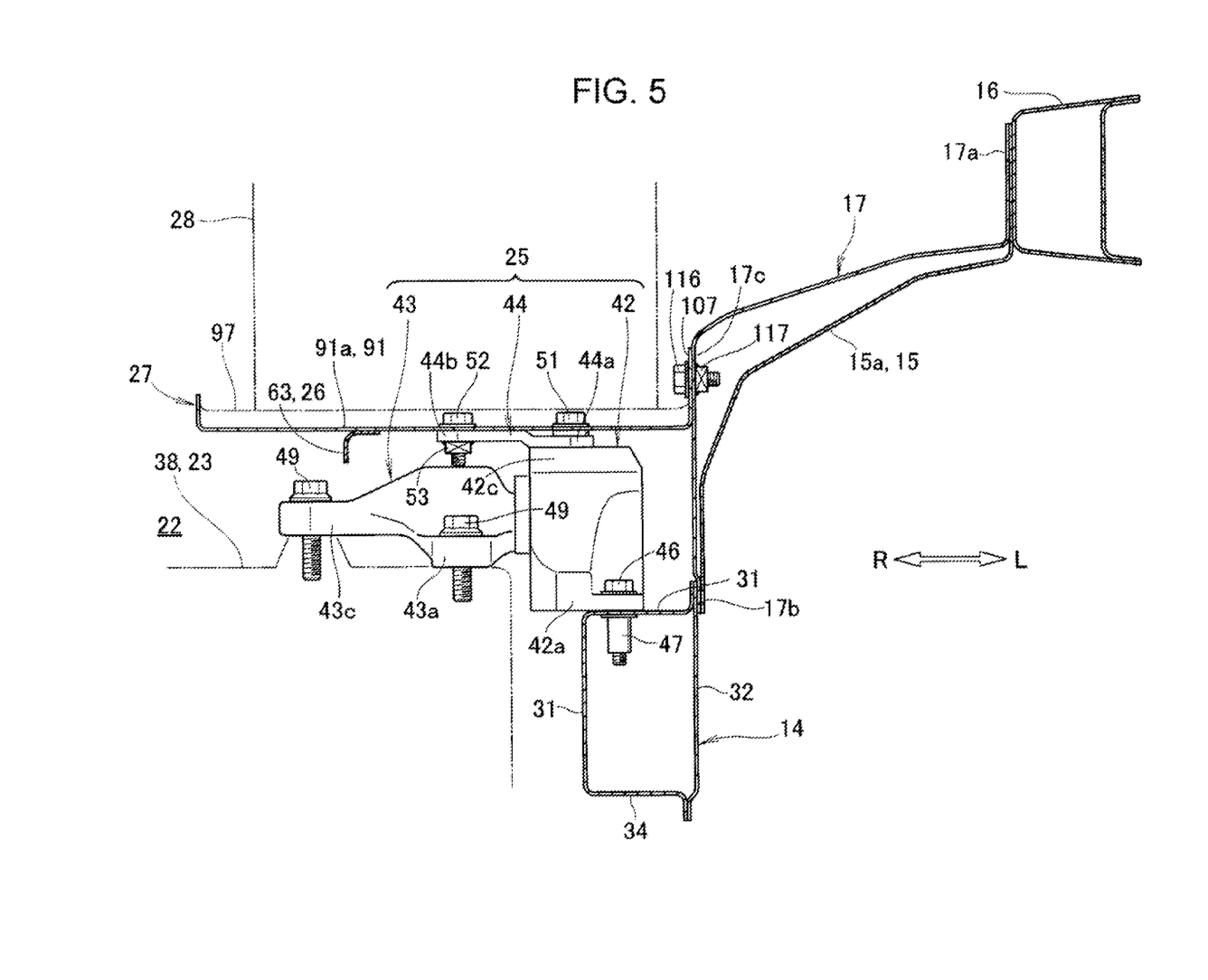
FIG. 5 is a cross-section taken along line V-V in FIG. 2.

As illustrated in FIG. 4 and FIG. 5, a front portion 42a and a rear portion 42b of the mount 42 are fastened to the upper portion 33 of the left front side frame 14 by bolts 46 and nuts 47. The mount 42 is thus coupled firmly to the upper portion 33.

The bracket 43 is connected to the mount 42 so as to project out from the mount 42 toward the vehicle width direction inside (namely, toward the engine room 22 side). A front arm 43a, a rear arm 43b, and an inside arm 43c of the bracket 43 are fastened to the transmission 38 of the power unit 23 by bolts 49. The bracket 43 is thereby coupled firmly to the transmission 38.

The extension support portion 44 extends out from a rear attachment portion 42c of the mount 42 toward the engine room 22 side. Specifically, the extension support portion 44 is a strip shaped plate member extending in the vehicle width direction. An outer end portion 44a of the extension support portion 44 is fixed jointly with the battery base 27 to the rear attachment portion 42c of the mount 42 by a bolt 51.

Moreover, the battery base 27 is fastened to an inner end portion 44b of the extension support portion 44 by a bolt 52 and a nut 53. Accordingly, a bottom portion 91 (specifically, a rear location 91a (see also FIG. 2) of the bottom portion 91 toward a rear wall 95) of the battery base 27 is supported by the extension support portion 44 in a state in which the extension support portion 44 extends in the vehicle width direction. Namely, the rear location 91a of the bottom portion 91 toward the rear wall 95 is a location corresponding to a rear portion of the battery base 27.

Note that the left power unit support section 25 is a member that supports the transmission 38 of the power unit 23. Namely, the left power unit support section 25 is a high rigidity member, and is coupled firmly to the left front side frame 14.

The extension support portion 44 extends in the vehicle width direction from the mount 42 of the left power unit support section 25.

The battery base 27 is accordingly supported in the vehicle width direction by the left power unit support-section 25 (in particular, the extension support portion 44). Namely, the left power unit support section 25 can be employed as a rear battery support section too, by the simple configuration of providing the left power unit support section 25 with the extension support portion 44. This thereby enables a reduction in the number of components of the rear battery support section, and enables a reduction in weight.

Figure 6:
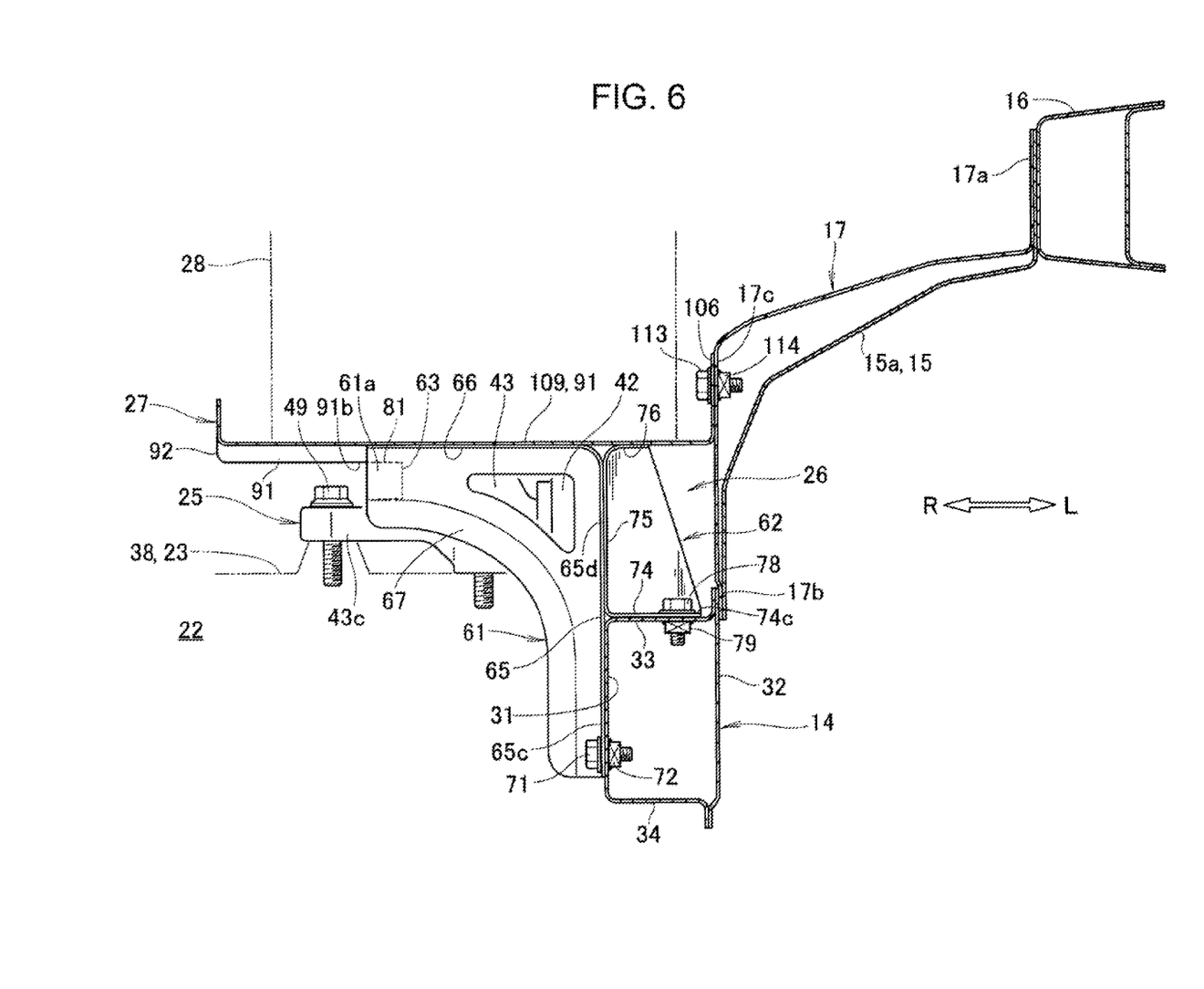
FIG. 6 is a cross-section taken along line VI-VI in FIG. 2.

As illustrated in FIG. 3 and FIG. 6, the battery support section 26 (namely, a front battery support section) is provided in the vicinity of the left power unit support section 25 at the vehicle body front side. The battery support section 26 includes a first support bracket 61 that is coupled to the inside wall 31 of the left front side frame 14, a second support bracket 62 that is coupled to the first support bracket 61, and a third support bracket 63 that is coupled to the first support bracket 61.

Figure 7:
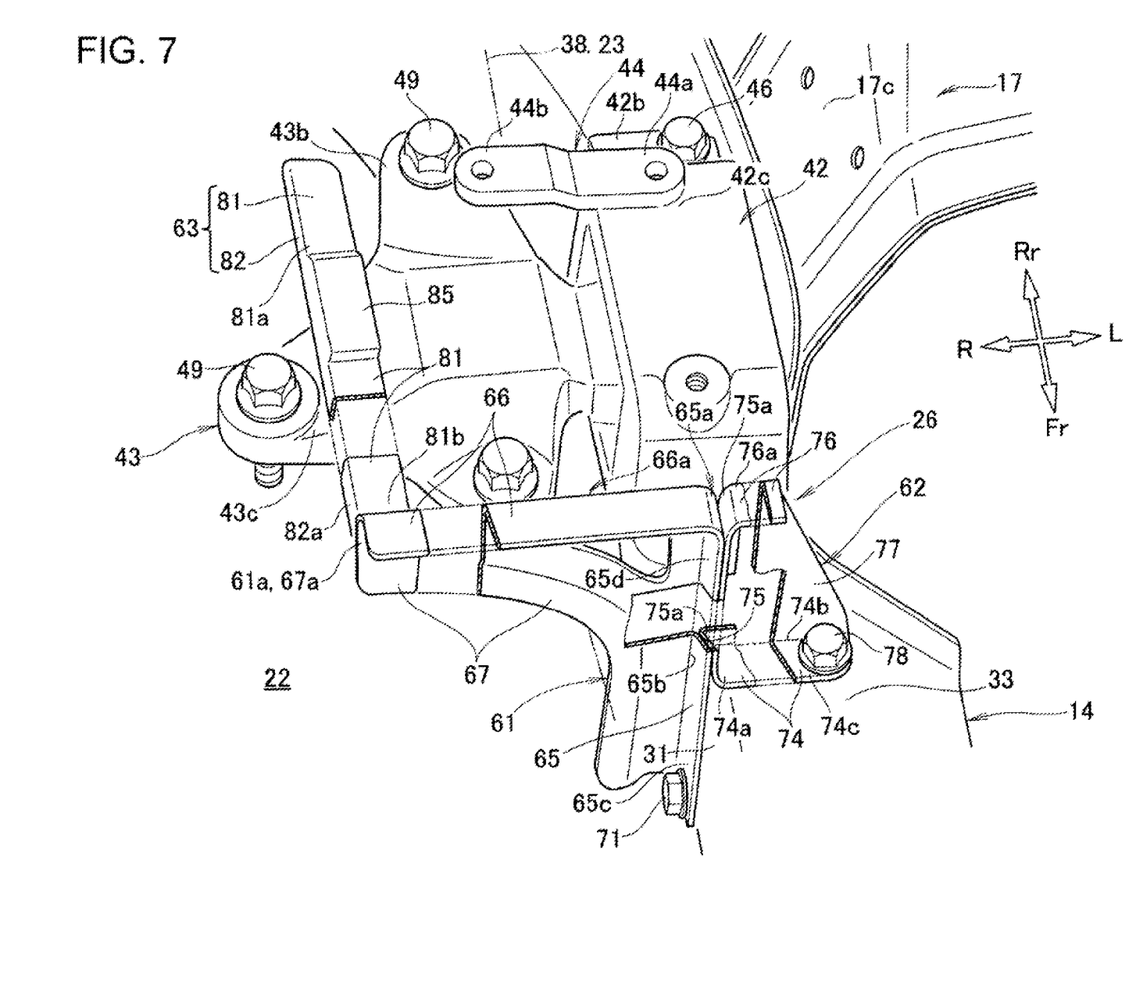
FIG. 7 is an enlarged view of area VII in FIG. 4.

As illustrated, in FIG. 7, the first support bracket 61 includes a first vertical frame 65 extending upward along the inside wall 31 of the left front side frame 14r a first horizontal frame 66 extending from an upper end 65a of the first vertical frame 65 toward the vehicle width direction inside (engine room 22 side), and a first gusset 67 integrally formed to the first vertical frame 65 and the first horizontal frame 66.

The first vertical frame 65 and the first horizontal frame 66 are formed in substantially L-shapes in side view. The first gusset 67 is integrally formed to a rear edge 65b of the first vertical frame 65 and a rear edge 66a of the first horizontal frame 66. The first vertical frame 65 and the first gusset 67 form a substantially re-shaped cross-section. The first horizontal frame 66 and the first gusset 67 also form a substantially L-shaped cross-section.

Namely, the first support bracket 61 is formed with a substantially L-shaped cross-section. The rigidity of the first support bracket 61 is thereby secured.

A lower portion 65c of the first vertical frame 65 of the first support bracket 61 is coupled to the inside wall 31 of the left front side frame 14 from the engine room 22 side by a bolt 71 and a nut 72 (see FIG. 6).

In this state, an upper half portion 65d of the first vertical frame 65 projects out upward from the upper portion 33 of the left front side frame 14 (see also FIG. 6).

The second support bracket 62 is coupled to the first support bracket 61 from the vehicle width direction outside. The second support bracket. 62 includes a lower second horizontal frame 74 extending in the vehicle width direction along the upper portion 33 of the left front side frame 14, a second vertical frame 75 extending upward from an inner end 74a of the lower second horizontal frame 74 along the upper half portion 65d of the first vertical frame 65, an upper second horizontal frame 76 extending from an upper end 75a of the second vertical frame 75 toward the vehicle width direction outside, and a second gusset 77 that is integrally formed to the lower second horizontal frame 74, the second vertical frame 75, and the upper second horizontal frame 76.

The lower second horizontal frame 74, the second vertical frame 75, and the upper second horizontal frame 76 form a substantially U-shape in side view. The second gusset 77 is integrally formed to a rear edge 74b of the lower second horizontal frame 74, a rear edge 75a of the second vertical frame 75, and a rear edge 76a of the upper second horizontal frame 76.

The lower second horizontal frame 74 and the second gusset 77 form a substantially L-shaped cross-section. The second vertical frame 75 and the second gusset 77 form a substantially L-shaped cross-section. The upper second horizontal frame 76 and the second gusset. 77 form a substantially L-shaped cross-section.

Namely, the second support bracket 62 is formed with a substantially L-shaped cross-section. The rigidity of the second support bracket 62 is thereby secured.

As illustrated in FIG. 6 and FIG. 7, an outer portion 74c of the lower second horizontal frame 74 of the second support bracket 62 is coupled to the upper portion 33 of the left front side frame 14 from above by a bolt 78 and a nut 79. In this state, the second support bracket 62 is provided standing upright from the upper portion 33 of the left front side frame 14, and runs along the upper half portion 65d of the first vertical frame 65.

The second vertical frame 75 is joined to the upper half portion 65d of the first vertical frame 65 from the vehicle width direction outside. The first support bracket 61 and the second support bracket 62 are thereby integrally joined together. The first support bracket 61 and the second support bracket 62 are accordingly coupled firmly to the inside wall 31 and the upper portion 33 of the left front side frame 14.

In this state, the first horizontal frame 66 of the first support bracket 61 and the upper second horizontal frame 76 of the second support bracket 62 are disposed substantially horizontally, and in the same plane as each other.

The third support bracket 63 is coupled to a free end 61a of the first support bracket 61. The third support bracket 63 includes a third horizontal frame 81 disposed in the same plane as the first horizontal frame 66 of the first support bracket 61, a third vertical frame 82 bent downward from an inner edge 81a of the third horizontal frame 81, and a third joining portion 83 (see FIG. 8) integrally formed to a front end 31b of the third horizontal frame 81, and a front end 82a of the third vertical frame 82.

Figure 8:
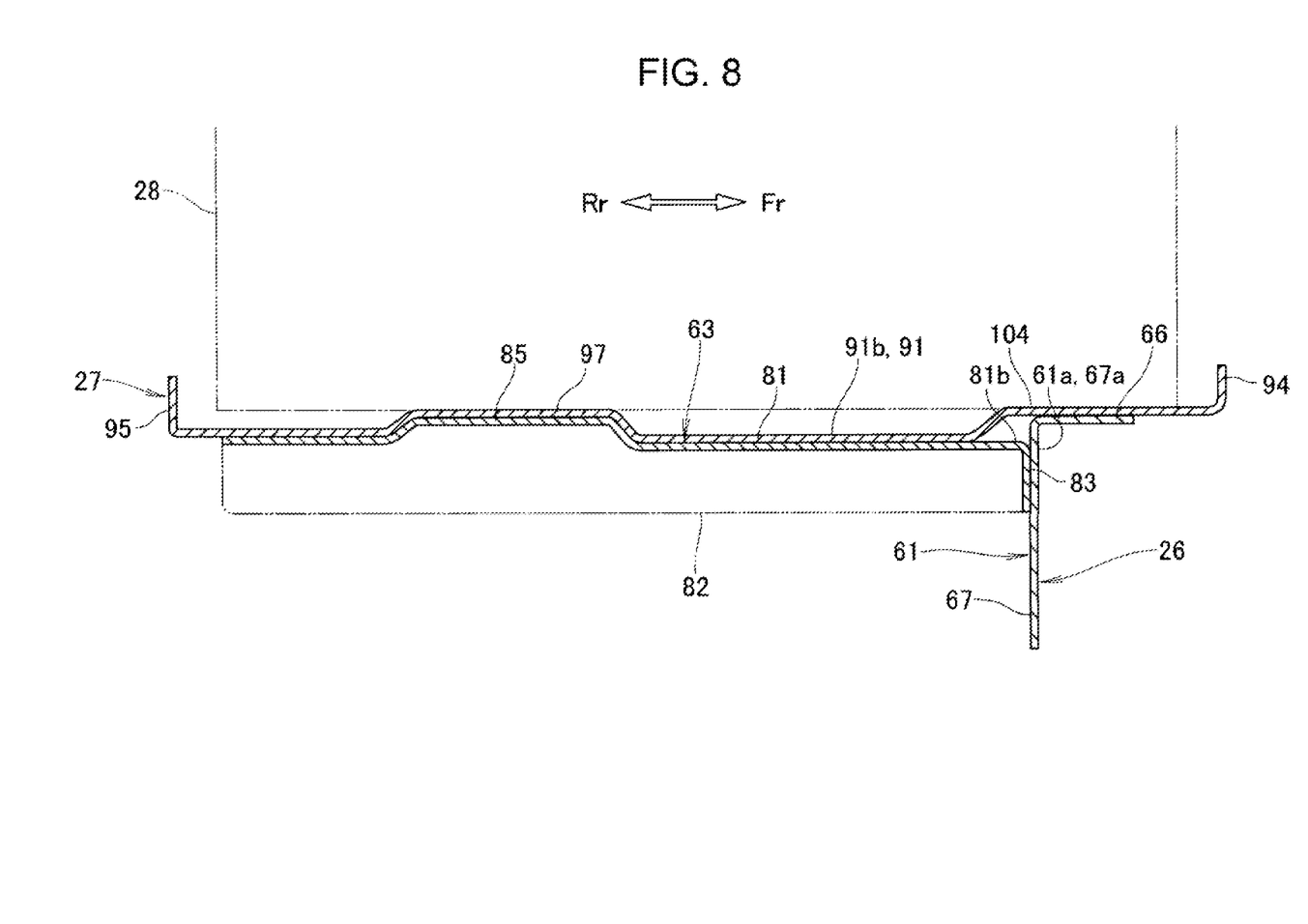
FIG. 8 is a cross-section taken along line VIII-VIII in FIG. 2.

As illustrated in FIG. 7 and FIG. 8, the third horizontal frame 81 is formed with a horizontal frame ridge 85 conforming to a raised portion 97 of the battery base 27 (namely, a location of the third support bracket conforming to a raised portion).

The third joining portion 83 is integrally joined to the free end 61a of the first support bracket 61 (namely, an inner end portion 67a of the first gusset 67). In this state, the third support bracket 63 extends out from the free end 61a of the first support bracket 61 toward the vehicle rear. In other words, the third support bracket 63 extends along a vehicle body front-rear direction.

The third horizontal frame 81 and the third vertical frame 82 form a substantially L-shaped cross-section. Namely, the third support bracket 63 is formed with a substantially L-shaped cross-section. The rigidity of the third support bracket 63 is thereby secured.

The first support bracket 61, the second support-bracket 62, and the third support bracket 63 are integrally joined together in this manner, thereby forming the battery support section 26 from the respective brackets 61, 62, 63. The extension support portion 44 is disposed at the vehicle width direction outside of a rear end portion 63a of the third support bracket 63.

The battery support section 26 is provided in the vicinity of the left power unit support section 25. Specifically, the first support bracket 61 of the battery support section 26 and the second support bracket 62 are disposed adjacent to each other at the vehicle body front of the left power unit support section 25. The first support-bracket 61 and the second support bracket 62 are integrally joined together, and are coupled to the inside wall 31 and the upper portion 33 of the left front side frame 14.

In this state, the first horizontal frame 66 of the first support bracket 61 extends out toward the vehicle width direction inside (namely, the engine room 22 side).

The third joining portion 33 is integrally joined together with the free end 61a of the first support bracket 61. The third support bracket 63 is thereby disposed adjacently above the inside arm 43c of the left power unit-support section 25 (specifically, the bracket 43).

Moreover, the extension support portion 44 of the left power unit support section 25 is disposed at the vehicle width direction outside of the rear end portion 63a of the third support bracket 63. The extension, support portion 44 extends in the vehicle width direction alongside the first horizontal frame 66 of the first support bracket 61.

Figure 9:
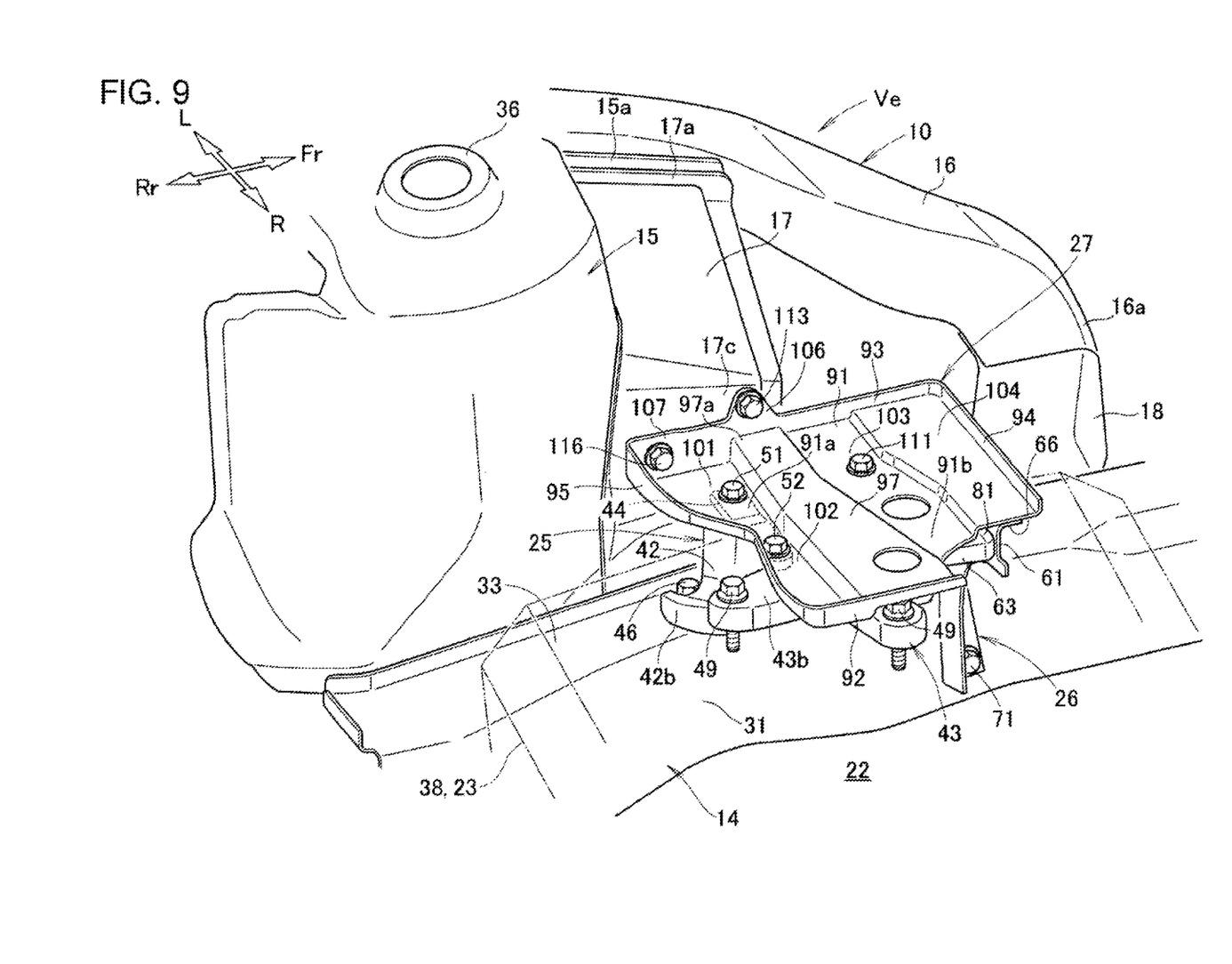
FIG. 9 is a drawing viewed along arrow IX in FIG. 2.

As illustrated in FIG. 3 and FIG. 9, the battery base 27 is attached to the first horizontal frame 66 of the first, support, bracket. 61, the upper second horizontal frame 76 of the second support bracket 62, the third horizontal frame 81 of the third support bracket 63, and the extension support portion 44.

Namely, the battery base 27 is attached to both the left power unit support section 25 and the battery support section 26.

The battery support section 26 is formed from the three members of the first support bracket 61, the second support bracket 62, and the third support, bracket 63. Each of the support brackets 61, 62, 63 is formed with a substantially L-shaped cross-section, securing the rigidity of the respective support, brackets 61, 62, 63 (see FIG. 7).

Accordingly, the rigidity of the first support bracket. 61, the second support bracket 62, and the third support bracket 63 is secured using simple shapes. Namely, the first support bracket 61, the second support bracket 62, and the third support bracket 63 can be easily bent from small steel plates. This thereby enables the cost of the battery support section 26 to be suppressed.

The battery base 27 can be well-supported by the battery support section 26 due to the rigidity of the battery support section 26 being secured.

The battery base 27 includes the bottom portion 91 that is formed in a substantially rectangular shape in plan view, an inner wall 92 standing upright from an inner edge of the bottom portion 91, an outer wall 93 standing upright from an outer edge of the bottom portion 91, a front wall 94 standing upright from a front edge of the bottom portion 91, and the rear wall 95 standing upright from a rear edge of the bottom portion 91.

The inner wall 92, the outer wall 93, the front wall 94, and the rear wall 95 are integrally connected together. The bottom portion 91 is thereby reinforced by the inner wall 92, the outer wall 93, the front wall 94, and the rear wall 95, securing the rigidity of the battery base 27.

The bottom portion 91 includes the raised portion 97 extending from the inner wall 92 to the outer wall 93 in the vehicle width direction, a first coupling portion (coupling portion) 101 and a second coupling portion (coupling portion) 102 formed in the vicinity of and at the vehicle body rear of the raised portion 97, a third coupling portion 103 formed at the vehicle body front of the raised portion 97, and a front step portion 104 (namely, a front portion of the battery base) formed at a front portion of the bottom portion 91.

The first coupling portion 101 and the second coupling portion 102 are formed at a rear portion of the bottom portion 91. The outer wall 93 includes a fourth coupling portion 106 and a fifth coupling portion 107.

The rigidity of the battery base 27 is further-raised by forming the raised portion 97 on the bottom portion 91 of the battery base 27. The first coupling portion 101 and the second coupling portion 102 are formed in the vicinity of the high rigidity raised portion 97. The first coupling portion 101 and the second coupling portion 102 are moreover coupled to the left power unit support section 25.

Note that the left power unit support section 25 is a member that supports the transmission 38 of the power unit 23, and has high rigidity and is coupled firmly to the left front side frame 14. The raised portion 97 is accordingly firmly supported by the left power unit support section 25.

As illustrated in FIG. 5, the first coupling portion 101 of the bottom portion 91 is fastened to the mount 42 by the bolt 51 jointly with the outer end portion 44a of the extension support portion 44. The second coupling portion 102 of the bottom portion 91 is fastened to the inner end portion 44b of the extension support portion 44 using the bolt 52 and the nut 53 (see FIG. 5). In this state, the rear location 91a of the bottom portion 91 toward the rear wall 95 is in contact with the extension support portion 44 (see FIG. 5).

Returning to FIG. 3 and FIG. 9, the third coupling portion 103 of the bottom portion 91 is fastened to the mount 42 with a bolt 111. Namely, the first coupling portion 101, the second coupling portion 102, and the third coupling portion 103 are coupled to the left power unit support section 25.

The front portion of the bottom portion 91 (namely, the front step portion 104) is joined to the first horizontal frame 66 of the first support bracket 61, and the upper second horizontal frame 76 of the second support bracket 62 (see also FIG. 6). Moreover, an inward location 91b toward the inner wall 92 of the bottom portion 91 is joined to the third horizontal frame 81 of the third support bracket 63. In this state, the horizontal frame ridge 85 of the third horizontal frame 81 is joined so as to conform to the raised portion 97 of the bottom portion 91 (see also FIG. 8).

In addition, in the outer wall 93 of the battery base 27, the fourth coupling portion 106 is formed above an outer end portion 97a on the outside of the raised portion 97, and the fifth coupling portion 107 is formed at the vehicle body rear of the outer end portion 97a. The fourth coupling portion 106 is fastened to an inner end portion 17c of the reinforcement member 17 by a bolt 113 and a nut 114 (see FIG. 6).

Namely, the outer end portion 97a of the raised portion 97 is coupled to the inner end portion 17c of the reinforcement member 17 by the bolt 113 and the nut 114. The raised portion 97 can thereby be even more firmly supported by the reinforcement member 17.

The fifth coupling portion 107 is fastened to the inner end portion 17c of the reinforcement member 17 by a bolt 116 and a nut 117 (see FIG. 5).

The front step portion 104 of the bottom portion 91 is attached to the first horizontal frame 66 of the first support bracket 61 and the upper second horizontal frame 76 of the second support bracket 62. Moreover, the first-coupling portion 101, the second coupling portion 102, and the third coupling portion 103 of the bottom portion 91 are attached to the left power unit support section 25.

The outer wall 93 is attached to the inner end portion 17c of the reinforcement member 17. In addition, the inward location 91b of the bottom portion 91 is attached to the third horizontal frame 81 of the third support bracket 63.

Namely, every side (namely, the entire periphery) of the battery base 27 is firmly supported by the left power unit support section 25, the battery support section 26, and the reinforcement member 17. The battery 28 (see FIG. 1) is mounted on the bottom portion 91 of the battery base 27. The battery 28 is attached to the battery base 27 using anchor rods, nuts, and the like, as in a standard attachment method.

The battery 28 is thereby supported on the battery base 27 in a stable state.

The left power unit support section 25 is provided toward a rear portion of the left front side frame 14. Toward the rear of the left front side frame 14, a large height dimension of the engine room 22 is secured. Accordingly, the battery 28 (see FIG. 1) is disposed at a position close to the rear portion of the left front side frame 14 where a large height dimension of the engine room 22 is secured.

This thereby enables a front portion of an engine hood that covers the engine room 22 from above to be inclined downward, increasing the degrees of freedom for the design (style) of the vehicle Ve.

Figure 10A:
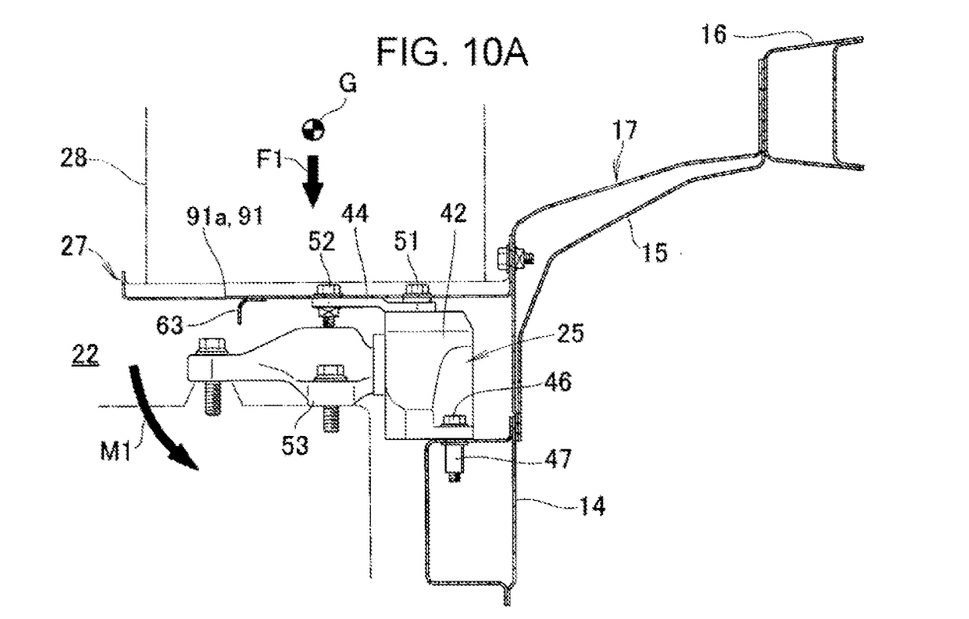
FIG. 10A is a drawing to explain an example of support of a battery by a battery support section and a left power unit support section according to the embodiment of the present disclosure.
Figure 10B:
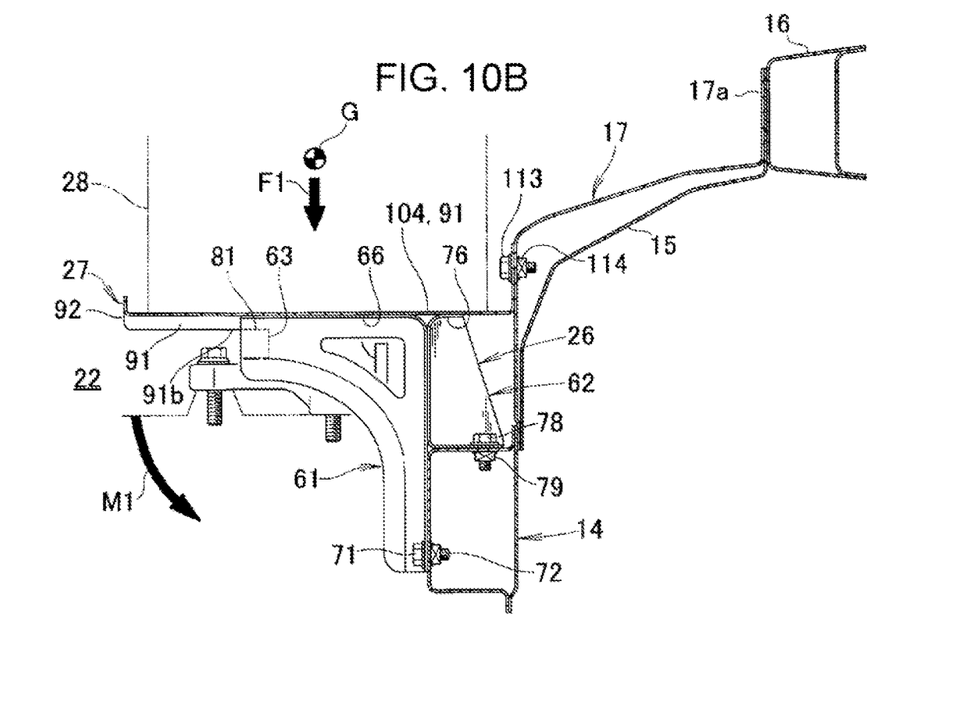
FIG. 10B is a drawing to explain an example of support of a battery by a battery support section and a left power unit support section according to the embodiment of the present disclosure.

Next, explanation follows regarding an example of support of the battery 28 by the battery support section 26 and the left power unit support section 25 according to the present disclosure, with reference to FIG. 10A and FIG. 10B.

As illustrated in FIG. 10A, the extension support portion 44 projects out from the mount 42 of the left power unit support section 25 toward the engine room 22 side. Namely, the extension support portion 44 projects out further toward the engine room 22 side than the left front side frame 14.

The rear location 91a of the bottom portion 91 toward the rear wall 95 of the battery base 27 is supported by the mount 42 and the extension support portion 44.

As illustrated in FIG. 10S, the first support bracket 61 of the battery support section 26 (specifically, the first horizontal frame 66) extends out from the left front side frame 14 toward the engine room 22 side.

The front step portion 104 of the bottom portion 91 is supported by the first horizontal frame 66 of the first support bracket 61 and the upper second horizontal frame 76 of the second support bracket 62. Moreover, the inward location 91b of the bottom portion 91 is supported by the third horizontal frame 81 of the third support bracket 63 of the battery support section 26.

Namely, the battery base 27 is supported at a position located further to the engine room 22 side than the left front side frame 14.

The battery 28 is attached to the battery base 27. A position of the center of gravity G of the battery 28 is accordingly positioned further to the engine room 22 side than the left front side frame 14. Namely, the weight F1 of the battery 28 acts further to the engine room 22 side than the left front side frame 14, as indicated by the arrow F1.

Note that the battery 28 is a member with a comparatively heavy weight. A comparatively large bending moment (what is referred to as tipping moment) due to the battery 28 therefore arises in the left power unit support section 25 (see FIG. 10A) and the battery support section 26, as indicated by the arrow M1.

The left power unit support section 25 illustrated in FIG. 10A is a high rigidity member, and is coupled firmly to the left front side frame 14. The battery support section 26 illustrated in FIG. 10B is coupled firmly to the inside wall 31 and the upper portion 33 of the left front side frame 14.

Accordingly, the comparatively large tipping moment M1 due to the battery 28 can be stably supported by the left power unit support section 25 and the battery support section 26. The battery 23 can accordingly be suppressed from tipping toward the vehicle width direction inside (namely, the engine room 22 side) by the left power unit support section 25 and the battery support section 26.

Figure 11:
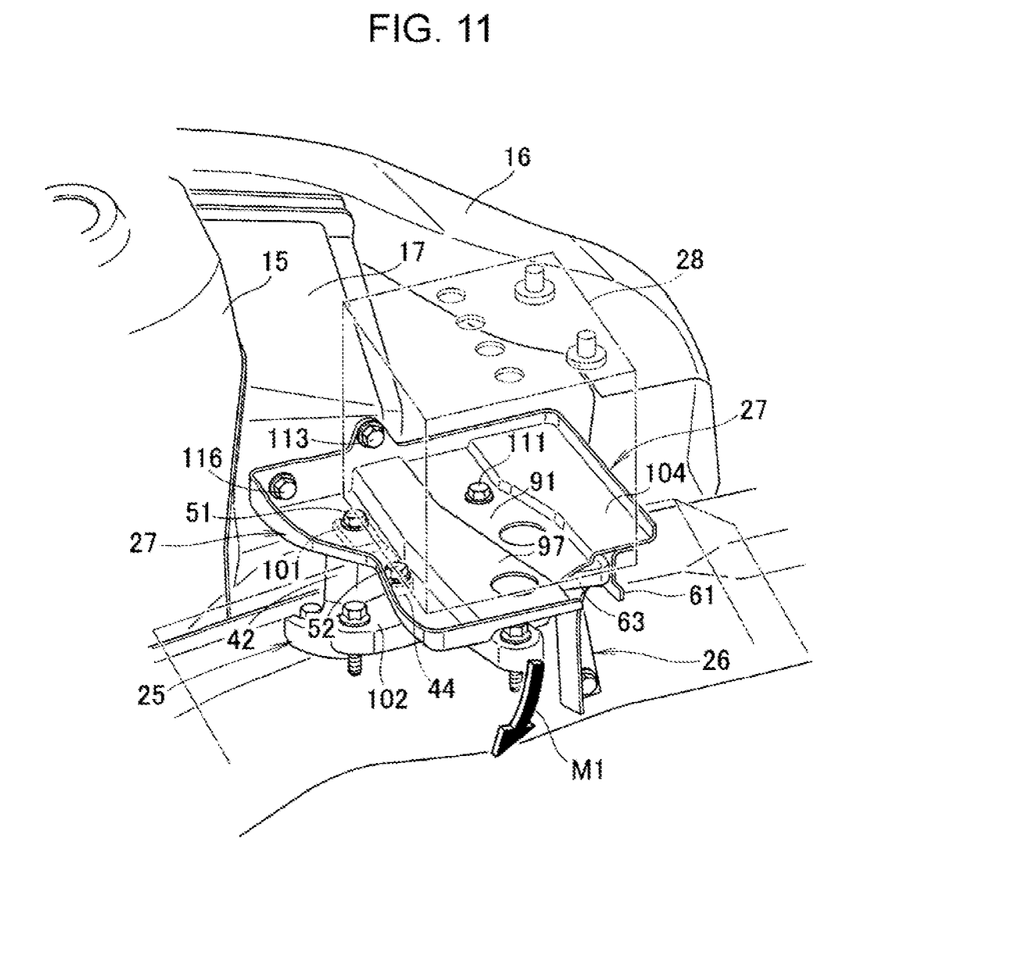
FIG. 11 is a drawing to explain an example of support of a battery by a raised portion and a reinforcement member according to the embodiment of the present disclosure.

Next, explanation follows regarding an example of support of the battery 28 by the raised portion 97 and the reinforcement member 17 of the present disclosure, with reference to FIG. 11.

As illustrated in FIG. 11, the first coupling portion 101 and the second coupling portion 102 of the bottom portion 91 of the battery base 27 are coupled to the left power unit support section 25 (specifically, the mount 42 and the extension support portion 44 (see also FIG. 10A)). The raised portion 97 is formed in the vicinity of the first-coupling portion 101 and the second coupling portion 102.

The raised portion 97 is thereby firmly supported by the mount 42 and the extension support portion 44. This thereby enables the comparatively large tipping moment M1 due to the battery 28 to be well-supported by the raised portion 97.

Moreover, the raised portion 97 of the battery base 27 is firmly supported by the reinforcement member 17. This thereby enables the comparatively large tipping moment M1 due to the battery 28 to be even better supported by the raised portion 97.

The vehicle body front structure of the present disclosure is not limited to the above embodiment, and may be modified or improved as appropriate.

For example, in the embodiment described above, explanation, has been given regarding an example in which the first support bracket 61 and the second support, bracket. 62 of the battery support section 26 are disposed at the vehicle body front of the left power unit, support section 25. However, there is no limitation thereto.

For example, the first support bracket 61 and the second support bracket 62 of the battery support section 26 may be disposed at the vehicle body rear of the left power unit support section 25.

Moreover, in the embodiment above, explanation has been given regarding an example in which the front portion of the bottom portion 91 is attached to the battery support section 26, and the rear portion of the bottom portion 91 is attached to the left power unit, support section 25. However, there is no limitation thereto.

For example, the rear portion of the bottom portion 91 may be attached to the battery support section 26, and the front portion of the bottom portion 91 may be attached to the left power unit support section 25.

Moreover, the shapes and configurations of the vehicle body front structure, the left and right, front side frames, the left and right, upper members, the reinforcement members, the power unit, the left power unit support section, battery support section, the battery base, the battery, the mount, the brackets, the extension support portion, the first support bracket, the second support bracket, the third support bracket, the horizontal frame ridge, and the raised portion are not limited to those given as examples in the embodiment described above, and may be modified as appropriate.

For example, the present disclosure is preferably applied to a vehicle provided with a vehicle body front structure in which a power unit is supported by a power unit support section of a front side frame. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A vehicle body front structure comprising:
   a front side frame that extends in a vehicle body front-rear direction;
   a power unit support member that projects from the front side frame toward a vehicle width direction inside, with the power unit support member configured to support a power unit of a vehicle;

a battery support member that is disposed on a front side or a rear side of the power unit support member, and coupled to an inside wall of the front side frame and an upper portion of the front side frame, the battery support member extending toward the vehicle width direction inside; and a battery base having a front portion attached to one of the battery support member and the power unit support member, and having a rear portion attached to the other of the battery support member and the power unit support member, with the battery base configured to mount a battery of a vehicle, wherein the battery base includes:
  a raised portion extending along the vehicle width direction; and
  a coupling portion that is disposed in the vicinity of the raised portion, and that is coupled to the power unit support member, wherein: the battery support member includes
  a first support bracket that is coupled to the inside wall of the front side frame, that extends upward from the inside wall to have an upward extension, and extends toward the vehicle width direction inside from an upper end of the upward extension,
  a second support bracket that is coupled to the first support bracket and to the upper portion of the front side frame, and that stands upright from the upper portion, and
  a third support bracket that is coupled to a free end of the first support bracket at the inside end thereof and extends in the vehicle body front-rear direction, and that includes a section conforming to the raised portion of the battery base; and the first support bracket, the second support bracket, and the third support bracket each has a substantially L-shaped cross-section.

2. The vehicle body front structure of claim 1, further comprising:
  an upper member that is provided above the front side frame and on a vehicle width direction outside of the front side frame;
  a reinforcement member that connects the upper member and the front side frame together; and
  an outside end portion of the raised portion being coupled to the reinforcement member.

3. The vehicle body front structure of claim 1, wherein the power unit support member includes:
  a mount that has a front portion and a rear portion both coupled to an upper portion of the front side frame;
  a bracket that projects from the mount toward the vehicle width direction inside, and that is coupled to the power unit; and
  an extension support portion that extends from the mount toward the vehicle width direction inside and that supports the battery base.

4. The vehicle body front structure of claim 1, wherein the upward extension of the first support bracket extends above the front side frame, and
  the second support bracket has a portion extending parallel to and joined to the upward extension above the front side frame.

5. The vehicle body front structure of claim 4, wherein the second support bracket includes a horizontal extension extending in the vehicle width direction, and
  the horizontal extension contacts and supports the battery base.

6. The vehicle body front structure of claim 4, wherein the first support bracket includes a first horizontal extension extending in the vehicle width direction,
  the second support bracket includes a second horizontal extension extending in the vehicle width direction and
  the first and second horizontal extensions each contact and support the battery base.

7. The vehicle body front structure of claim 1, wherein the third support bracket includes the section conforming to a contour of the raised portion of the battery base.

8. The vehicle body front structure of claim 7 wherein the raised portion includes an upward recess on a rear surface of the battery base, and
  the third support bracket includes the section conforming to a contour of the upward recess.

9. A vehicle comprising the vehicle body front structure of claim 1.

* * * * *